US012662988B2

(12) United States Patent
Kwon et al.

(10) Patent No.: US 12,662,988 B2
(45) Date of Patent: Jun. 23, 2026

(54) ENERGY HARVESTER DEVICE AND METHOD OF MANUFACTURING SAME

(71) Applicants: Hyundai Motor Company, Seoul (KR); Kia Corporation, Seoul (KR)

(72) Inventors: Dae-Sung Kwon, Seoul (KR); Il-Seon Yoo, Suwon-si (KR); Hyun-Soo Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 191 days.

(21) Appl. No.: 18/678,913

(22) Filed: May 30, 2024

(65) Prior Publication Data

US 2025/0305479 A1     Oct. 2, 2025

(30) Foreign Application Priority Data

Mar. 26, 2024     (KR) ........................ 10-2024-0040912

(51) Int. Cl.
F03D 5/00          (2006.01)
H02N 1/04          (2006.01)
(52) U.S. Cl.
CPC ................. F03D 5/00 (2013.01); H02N 1/04 (2013.01)

(58) Field of Classification Search
CPC .............. F03D 5/00; H02N 1/04; Y02E 10/00
See application file for complete search history.

(56) References Cited

U.S. PATENT DOCUMENTS 6,146,780 A * 11/2000 Cisar ................. H01M 8/04074
                                                            429/513
2021/0291497 A1* 9/2021 Shin ...................... B32B 27/065

FOREIGN PATENT DOCUMENTS

KR          101920321 B1     11/2018

* cited by examiner

*Primary Examiner* — Sean Gugger
(74) *Attorney, Agent, or Firm* — Slater Matsil, LLP

(57)          ABSTRACT

An embodiment energy harvester device includes a metal foam including a conductive material and having a plurality of fluid flow holes disposed in an outer surface thereof and a plurality of beads comprising a non-conductive material and disposed separately inside the metal foam, wherein the beads are configured to be moved by a fluid passing through the fluid flow holes to cause movement of electrons due to a change in contact state between the beads and the metal foam.

20 Claims, 6 Drawing Sheets

210

310

ENERGY HARVESTER DEVICE AND METHOD OF MANUFACTURING SAME

CROSS-REFERENCE TO RELATED APPLICATIONS

This application claims the benefit of Korean Patent Application No. 10-2024-0040912, filed on Mar. 26, 2024, which application is hereby incorporated herein by reference in its entirety.

TECHNICAL FIELD

The present invention relates to an energy harvester device.

BACKGROUND

Embodiments of the present disclosure relate to an energy harvester for harvesting electrical energy by the triboelectric effect.

In other words, embodiments of the present disclosure provide an energy harvesting method using electron movement when contact/separation occurs between materials with different electronegativity and has an advantage of a large output voltage and a wide range of usable materials, but a disadvantage in that a surface charge is dissipated by moisture to reduce an output.

Conventional triboelectric wind energy harvesters largely include a harvester using blades/wind cups similar to wind power generators, a harvester using wind channels, a harvester using thin flat plates having spacers, a harvester using a whistle structure, etc., and research on using the harvesters as a self-powered wind speed and wind direction sensor is being actively conducted.

Among them, the harvester using a venturi-structured wind channel has a simple structure, but it may harvest energy in response to only the wind in a channel direction and thus is difficult to respond to the wind in all directions.

In addition, the triboelectric-electromagnetic induction hybrid harvester using the wind cup may harvest energy in response to the wind in all directions, but it has a complicated structure and thus has limitations in increasing the volume and mass of the system, and it has vibration and noise problems caused by moving structures.

In addition, there is a triboelectric harvester using beads that move inside a structure with electrodes, such as a structure similar to a whistle, but when a single bead is used, the output is low, and when multiple beads are used, it is necessary to inevitably require relatively large power to move all of the beads.

In addition, the triboelectric harvester has a structure in which an inlet and an outlet are formed at fixed locations and may generate an output in response to only the wind blowing toward the inlet, and thus it is difficult to harvest energy in response to the wind in all directions.

Matters described above in the background art are intended to help understanding of the background of the disclosure and may include matters not related to the already known art.

SUMMARY

The present invention relates to an energy harvester device. Particular embodiments relate to an energy harvester device using the flow of a fluid.

Embodiments of the present disclosure can solve problems occurring in the art and provide a harvester device capable of more effectively responding to external forces in all directions and a method of manufacturing the same.

An energy harvester device according to one embodiment of the present disclosure includes a metal foam made of a conductive material and having a plurality of fluid flow holes formed in an outer surface thereof and a plurality of beads made of a non-conductive material and disposed separately inside the metal foam, wherein the plurality of beads are moved by a fluid passing through the fluid flow hole to cause the movement of electrons due to a change in contact state between the beads and the metal foam.

Here, the metal foam may be made of a metal material, and the beads may be made of a polytetrafluoroethylene (PTFE) material or a nylon material.

In addition, a diameter of the fluid flow hole may be smaller than a diameter of the beads.

In addition, a plurality of bead cavities into which the plurality of beads are inserted, respectively, may be separately formed inside the metal foam.

In addition, a diameter of the bead cavities may be larger than a diameter of the beads.

Furthermore, a fluid flow hole may be formed in the bead cavities to allow the fluid to be introduced and discharged through the fluid flow hole formed in the bead cavities and the fluid flow hole formed in the outer surface of the metal foam.

In addition, the metal foam may have a flat shape, the metal foam may have a cylinder shape in which both ends are bonded by rolling the metal foam having the flat shape, and the metal foam may have a twist shape in which both ends of the metal foam having the flat shape in a longitudinal direction rotate in opposite directions using the longitudinal direction as an axis.

Meanwhile, the metal foam may be provided by bonding a first metal foam and a second metal foam, and the beads may be inserted into the bead cavities between the first metal foam and the second metal foam formed by bonding the first metal foam and the second metal foam.

In addition, a polymer film layer for insulation may be formed on a bonded surface of the first metal foam and the second metal foam.

Next, a method of manufacturing an energy harvester device includes arranging a first metal foam and a second metal foam, which have a plurality of fluid flow holes formed in outer surfaces thereof and are made of a conductive material, to face each other, arranging a plurality of cavity formation beads between the first metal foam and the second metal foam, removing the cavity formation beads after pressing the first metal foam and the second metal foam, and respectively inserting a plurality of beads made of a non-conductive material into a plurality of bead cavities formed by the pressing of the first metal foam and the second metal foam and bonding the first metal foam to the second metal foam.

In addition, the method may further include forming a polymer film layer for insulation on one surface of the first metal foam or the second metal foam before the arranging of the cavity formation beads.

Here, the forming of the polymer film layer for insulation may include forming the polymer film layer for insulation in an area other than an area in which the bead cavities are formed.

Meanwhile, the metal foam may be made of a metal material, and the beads may be made of a polytetrafluoroethylene (PTFE) material or a nylon material.

In addition, a diameter of the fluid flow holes may be smaller than a diameter of the beads.

In addition, a diameter of the bead cavities may be larger than a diameter of the beads.

Furthermore, the method may further include rolling a metal foam bonded by the bonding of the first metal foam and the second metal foam and bonding both ends thereof.

In addition, the method may further include rotating both ends of a metal foam bonded by the bonding of the first metal foam and the second metal foam in a longitudinal direction in opposite directions using the longitudinal direction as an axis.

The energy harvester device according to embodiments of the present disclosure may be installed in any of various structures at the desired place to harvest the wind energy.

The energy harvester device may have the structure using the movement of the individual particles and easily harvest the energy even with the wind in the low wind speed range.

In addition, the energy harvester device may be manufactured in the form of a thin flat plate and installed in the form of being attached to the surfaces of various structures.

In addition, it is possible to easily manufacture the structure in which the energy may be harvested from the wind in all directions through the modification of the flat plate type harvester.

DETAILED DESCRIPTION OF ILLUSTRATIVE EMBODIMENTS

For a full understanding of embodiments of the present disclosure, operational advantages of embodiments of the present disclosure, and objects achievable by practicing embodiments of the present disclosure, reference should be made to the accompanying drawings, which illustrate preferred embodiments of the present disclosure, and contents described in connection with the accompanying drawings.

In describing the preferred embodiments of the present disclosure, a description of known techniques or repetitive descriptions that may unnecessarily obscure the gist of embodiments of the present disclosure will be reduced or omitted.

Figure 1:
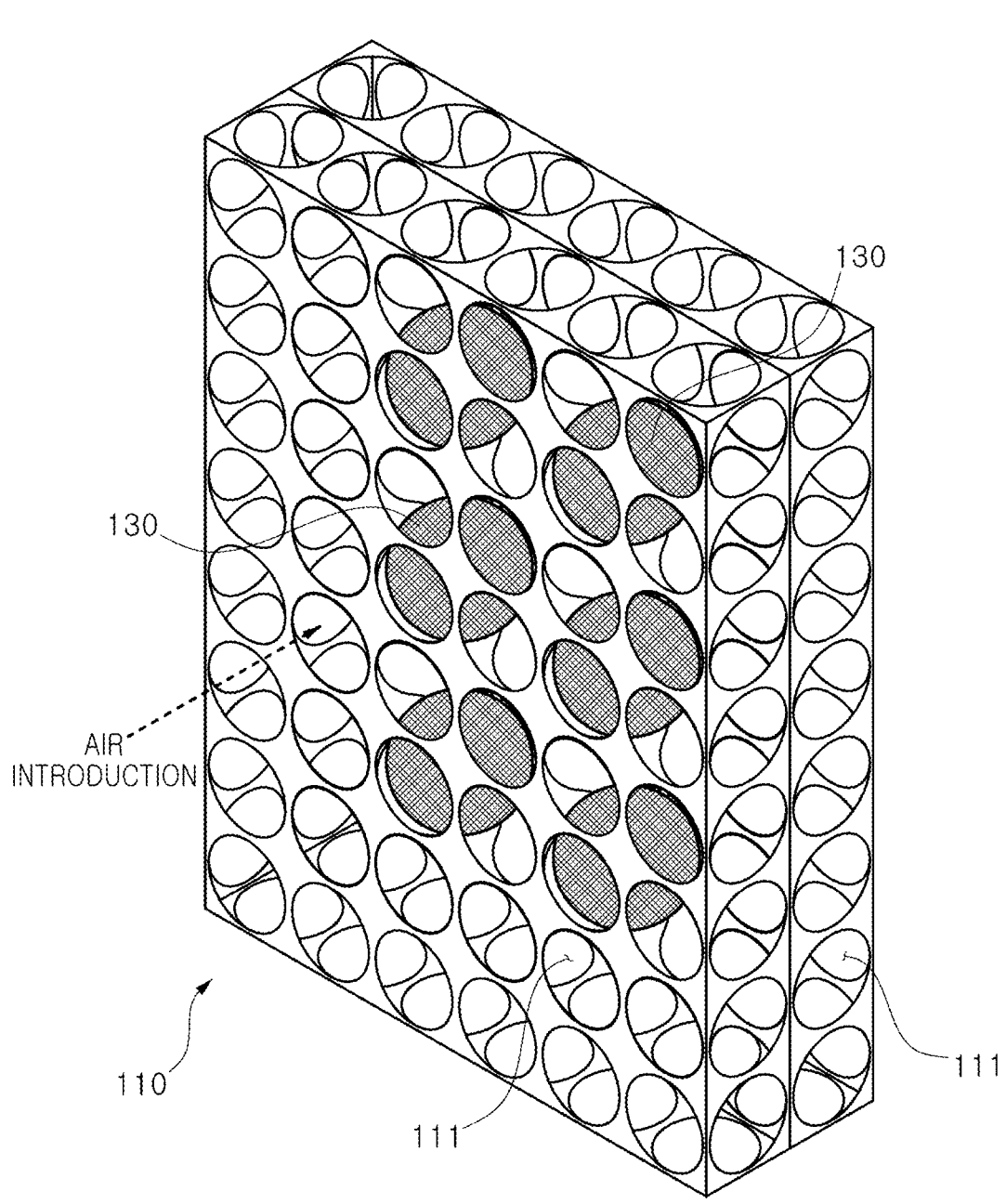
FIG. 1 shows an energy harvester device according to embodiments of the present disclosure.
Figure 2:
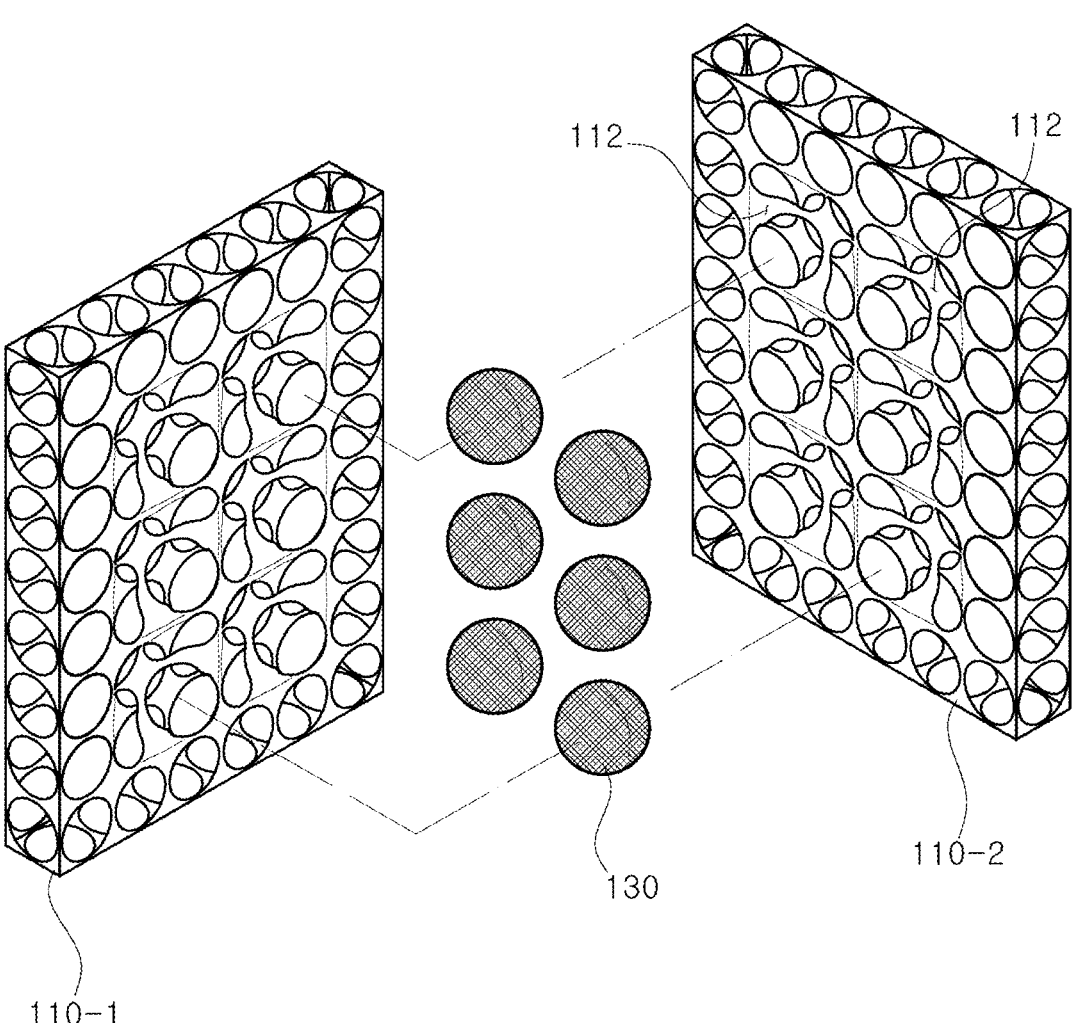
FIG. 2 shows a disassembled state of FIG. 1.

FIG. 1 shows an energy harvester device according to embodiments of the present disclosure, and FIG. 2 shows a disassembled state of FIG. 1.

Hereinafter, an energy harvester device according to one embodiment of the present disclosure will be described with reference to FIGS. 1 and 2.

Embodiments of the present disclosure provide a triboelectric type omnidirectional energy harvester device, which is a device for harvesting energy in a triboelectric manner by causing contact-separation between a bead 130 and a metal foam 110 as the bead 130 is moved by a fluid such as wind.

The energy harvester device according to embodiments of the present disclosure includes the conductive metal foam 110 and the non-conductive bead 130 provided in the metal foam 110.

The metal foam 110 is made of Al, etc. and serves as an electrode, and the bead 130 may be made of a material such as polytetrafluoroethylene (PTFE).

The metal foam 110 may have a flat shape as shown, and a plurality of fluid flow holes 111 are formed on the entirety of an outer surface thereof so that a fluid, such as air, is introduced and discharged through the fluid flow holes 111.

In addition, a plurality of beads 130 are inserted into the metal foam 110 to form a plurality of bead cavities 112 partitioned so that each bead 130 may flow therethrough.

For the operation of the bead 130, a diameter of the bead cavity 112 is preferably larger than that of the bead 130, the bead cavity 112 communicates with the fluid flow hole 111, and the fluid flow hole 111 is also formed in the bead cavity 112.

In addition, the fluid flow hole 111 preferably has a diameter smaller than the diameter of the bead 130.

With this configuration, when air is introduced into or discharged from the harvester device, the non-conductive beads 130 move in the metal foam 110 and a contact area with an electrode of the metal foam 110 is changed, thereby harvesting energy.

FIGS. 3A to 3E show a method of manufacturing an energy harvester device according to embodiments of the present disclosure.

Figure 3A:
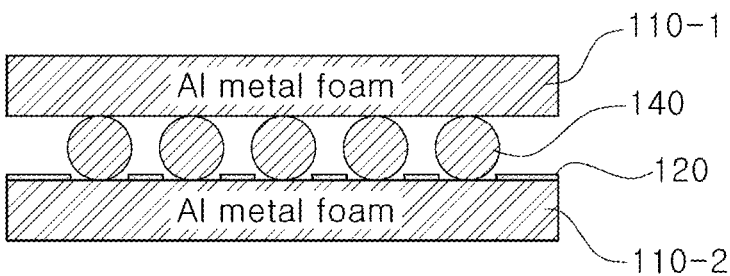
FIGS. 3A to 3E show a method of manufacturing an energy harvester device according to embodiments of the present disclosure.

Referring to FIG. 3A, to manufacture the metal foam 110, a first metal foam 110-1 and a second metal foam 110-2 in which the plurality of fluid flow holes 111 are formed are disposed to face each other, and a polymer film layer 120 for insulating an Al electrode is formed in an area other than the formation area of the bead cavity 112 of the facing one surface of the first metal foam 110-1 or the second metal foam 110-2.

In addition, a plurality of cavity formation beads 140 are disposed between the first metal foam 110-1 and the second metal foam 110-2. The cavity formation bead 140 may be a metal mold and has a larger diameter than the bead 130 as described above.

Figure 3B:
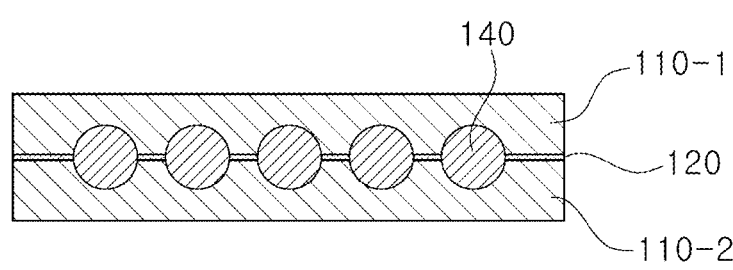
Figure 3C:
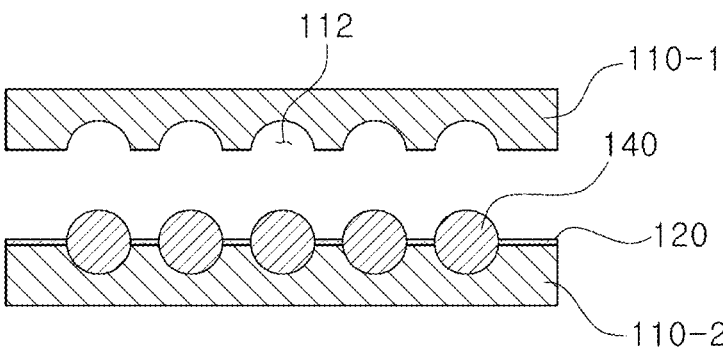

After the above-described arrangement, as shown in FIG. 3B and FIG. 3C, the first metal foam 110-1 and the second metal foam 110-2 are pressed to be in contact with each other and then separated to remove the cavity formation bead 140, and thus the bead cavity 112 is formed inside the metal foam 110.

Figure 3D:
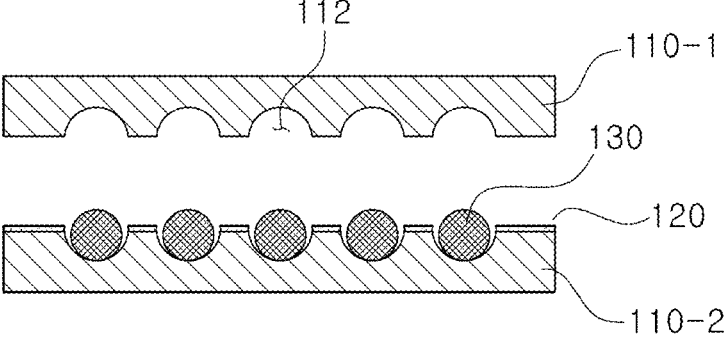
Figure 3E:
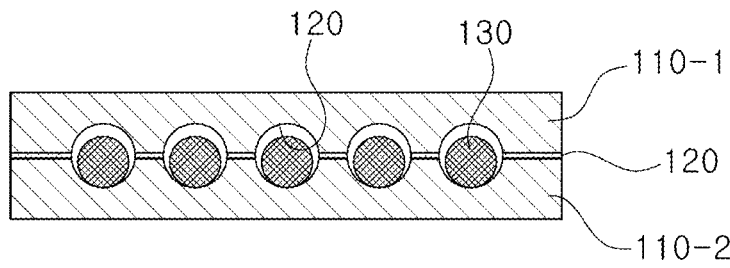

After each bead 130 is inserted into each bead cavity 112 formed by a modified space in FIG. 3D, the first metal foam 110-1 and the second metal foam 110-2 are bonded to manufacture an energy harvester device.

Figure 4:
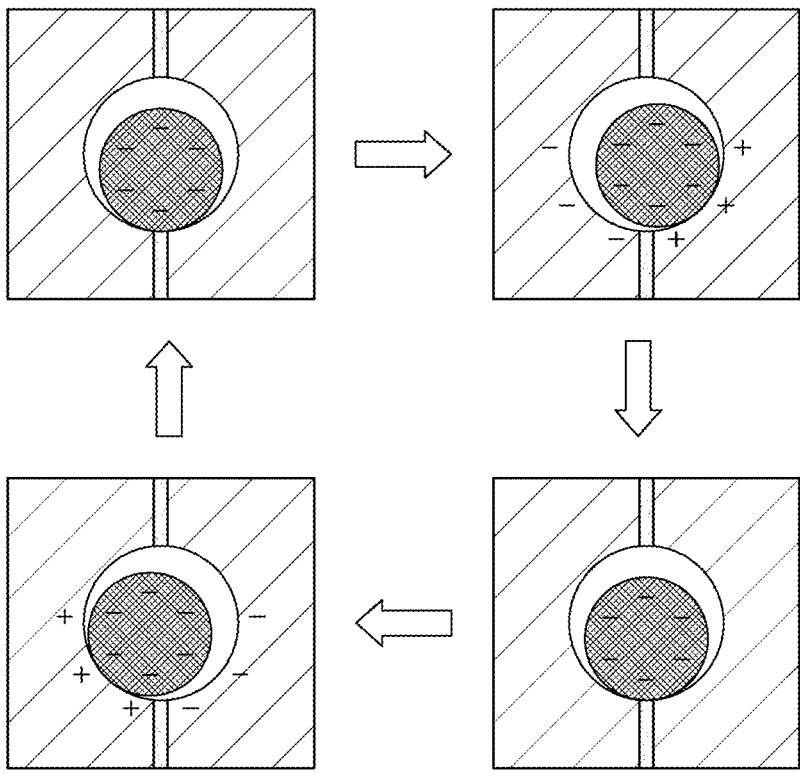
FIG. 4 shows a triboelectric state according to the bead movement of the energy harvester device according to embodiments of the present disclosure.

The energy harvester device manufactured as described above is driven as shown in FIG. 4.

In other words, a harvester driving principle based on the metal foam-particles is that the PTFE bead 130 freely moves in the bead cavity 112 formed by modifying the metal foam, and as the fluid is introduced and discharged through the fluid flow hole 111 like the blowing wind, the PTFE bead is moved in the two metal foams 110-1 and 110-2, and the contact area with the electrode is changed to generate power in the triboelectric manner.

Figure 5:
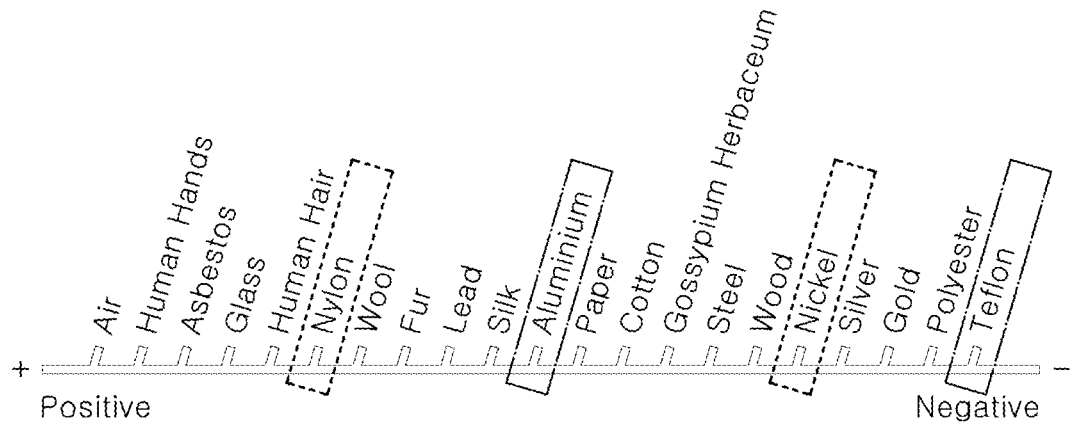
FIG. 5 shows a triboelectric series.

FIG. 5 shows a triboelectric series and a metal foam-particle material may be selected accordingly.

As the metal foam-particle material, a pair of materials that are far from each other in the triboelectric series are preferably selected, and as the pair of particle materials required to have the insulation property with the metal foam used as the electrode, a pair of Al-PTFE (Teflon) or a pair of nickel-nylon may be preferably used.

The energy harvester device according to embodiments of the present disclosure may harvest the energy even in the low wind speed range because only each single particle is moved by the wind.

In addition, it is possible to increase the output of the harvester by arranging a large number of particles in a wide flat metal foam, and since the energy harvester device is manufactured in the thin flat shape, the limitations of the installation space are less.

The energy harvester device may be installed to make it upright on the ground in the form of a pillar or installed in a manner of being attached to an outer wall of a structure.

By constituting only a simple device having the metal foam through which air passes filled with the non-conductive particles, it is possible to variously manufacture the structure of the harvester and modify the structure to harvest the energy in response to the wind in all directions.

Figure 6:
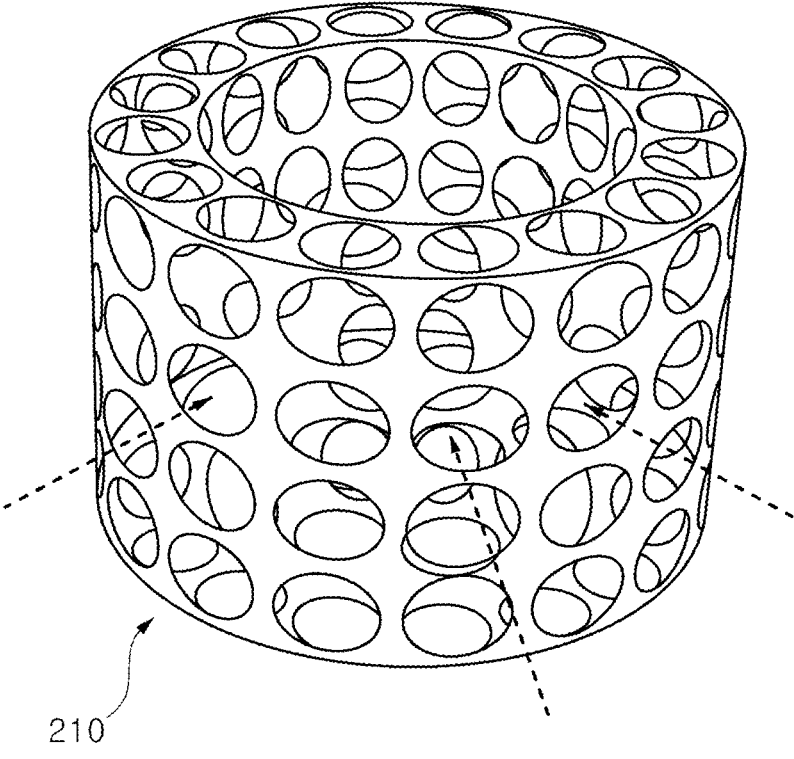
FIG. 6 shows a first application example of the energy harvester device according to embodiments of the present disclosure.
Figure 7:
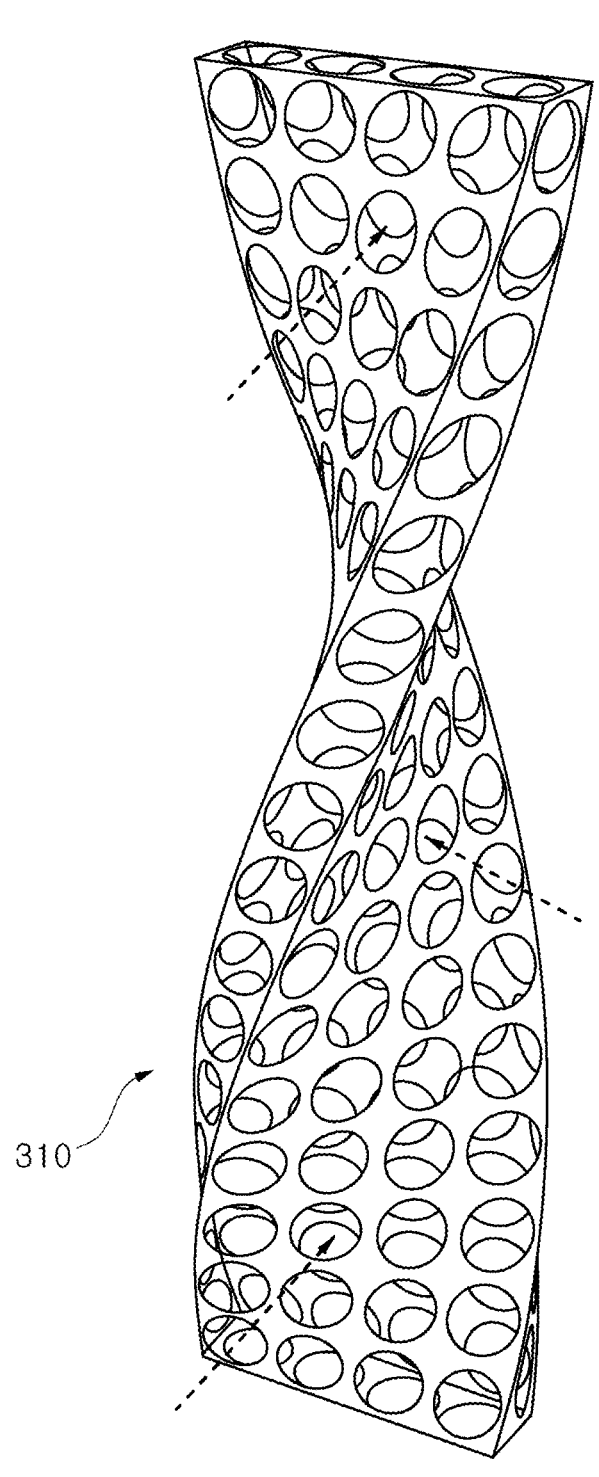
FIG. 7 shows a second application example of the energy harvester device according to embodiments of the present disclosure.

FIGS. 6 and 7 show applications of the structure modifications.

In other words, as applications, the metal foam-particle energy harvester device manufactured in the thin flat form may be manufactured as an energy harvester device 210 in the form of rolling in the cylinder shape and bonding both ends as shown in FIG. 6, or an energy harvester device 310 having a twist shape in which both ends in a longitudinal direction rotate in opposite directions using the longitudinal direction as an axis as shown in FIG. 7.

It is possible to harvest the energy (harvest the wind energy in all directions) in response to the wind blowing from more diverse directions compared to the flat-shaped harvester, and the energy harvester device may be manufactured according to the intended use.

Although exemplary embodiments of the present disclosure have been described above with reference to the exemplary drawings, the present disclosure is not limited to the described embodiments, and it is apparent to those skilled in the art that various modifications and changes can be made without departing from the spirit and scope of the present disclosure. Therefore, these modified examples or changed examples should be included in the claims of the present disclosure, and the scope of the present disclosure should be construed based on the appended claims.

What is claimed is:

1. An energy harvester device comprising:
   a metal foam comprising a conductive material and having a plurality of fluid flow holes disposed in an outer surface thereof; and
   a plurality of beads comprising a non-conductive material and disposed separately inside the metal foam, wherein the beads are configured to be moved by a fluid passing through the fluid flow holes to cause movement of electrons due to a change in contact state between the beads and the metal foam.

2. The energy harvester device of claim 1, wherein the metal foam comprises a metal material and the beads comprise a polytetrafluoroethylene (PTFE) material or a nylon material.

3. The energy harvester device of claim 1, wherein a diameter of each of the fluid flow holes is smaller than a diameter of each of the beads.

4. The energy harvester device of claim 1, further comprising a plurality of bead cavities separately disposed inside the metal foam, wherein the beads are inserted in the bead cavities, respectively.

5. The energy harvester device of claim 4, wherein a diameter of each of the bead cavities is larger than a diameter of each of the beads.

6. The energy harvester device of claim 4, further comprising a plurality of second fluid flow holes respectively disposed in the plurality of bead cavities, wherein the energy harvester device is configured to allow the fluid to be introduced and discharged through the second fluid flow holes disposed in the bead cavities and the fluid flow holes disposed in the outer surface of the metal foam.

7. The energy harvester device of claim 6, wherein the metal foam has a flat shape.

8. The energy harvester device of claim 6, wherein the metal foam has a cylindrical shape in which both ends are bonded by rolling the metal foam having a flat shape.

9. The energy harvester device of claim 6, wherein the metal foam has a twisted shape in which both ends of the metal foam having a flat shape in a longitudinal direction rotate in opposite directions around a longitudinal axis.

10. The energy harvester device of claim 1, wherein:
   the metal foam comprises a first metal foam and a second metal foam bonded together; and
   each of the beads is inserted respectively into each of a plurality of bead cavities disposed between the first metal foam and the second metal foam.

11. The energy harvester device of claim 10, further comprising a polymer film layer disposed on a bonded surface of the first metal foam and the second metal foam, wherein the polymer film layer is an insulator.

12. A method of manufacturing an energy harvester device, the method comprising:
   arranging a first metal foam and a second metal foam to face each other, wherein each of the first metal foam and the second metal foam comprise a conductive material and have a plurality of fluid flow holes formed in outer surfaces thereof;
   arranging a plurality of cavity formation beads between the first metal foam and the second metal foam;
   pressing the first metal foam and the second metal foam together with the cavity formation beads disposed between the first metal foam and the second metal foam;
   separating the first metal foam and the second metal foam and removing the cavity formation beads leaving a plurality of bead cavities formed on facing surfaces of the first metal foam and the second metal foam;
   respectively inserting a plurality of beads into the plurality of bead cavities, each of the beads comprising a non-conductive material; and
   bonding the facing surfaces of the first metal foam and the second metal foam to form a metal foam.

13. The method of claim 12, further comprising forming a polymer film layer on the facing surface of the first metal foam or the second metal foam before arranging the plurality of cavity formation beads, wherein the polymer film layer is an insulator.

14. The method of claim 13, wherein forming the polymer film layer comprises forming the polymer film layer in an area other than an area in which the plurality of bead cavities is formed.

15. The method of claim 12, wherein the metal foam comprises a metal material and the beads comprise a poly-tetrafluoroethylene (PTFE) material or a nylon material.

16. The method of claim 12, wherein a diameter of each of the fluid flow holes is smaller than a diameter of each of the beads.

17. The method of claim 12, wherein a diameter of each of the bead cavities is larger than a diameter of each of the beads.

18. The method of claim 12, further comprising rolling the metal foam formed by bonding the facing surfaces of the first metal foam and the second metal foam and bonding both ends thereof to form a cylindrical shape.

19. The method of claim 12, further comprising rotating both ends of the metal foam formed by bonding the facing surfaces of the first metal foam and the second metal foam in opposite directions around a longitudinal axis.

20. The method of claim 12, wherein the metal foam formed by bonding the facing surfaces of the first metal foam and the second metal foam has a flat shape.

\* \* \* \* \*